PIEZOELECTRIC CERAMIC COMPOSITION

Filed Nov. 24, 1970

SEIJI IKEGAMI and
ICHIRO UEDA, Inventors

BY Wenderoth Lind & Ponack
Attorneys

United States Patent Office 3,642,637
Patented Feb. 15, 1972

3,642,637

PIEZOELECTRIC CERAMIC COMPOSITION

Seiji Ikegami, Osaka-fu, and Ichiro Ueda, Hyogo-ken, Japan, assignors to Matsushita Electric Industrial Co., Ltd., Kadoma, Osaka, Japan Filed Nov. 24, 1970, Ser. No. 92,382
Claims priority, application Japan, Dec. 26, 1969, 44/623
Int. Cl. C04b *35/46*
U.S. Cl. 252—62.9 1 Claim

ABSTRACT OF THE DISCLOSURE

The present invention is directed to a novel piezoelectric ceramic consisting essentially of lead titanate and a combined additive of 0.22 to 0.36 weight percent of manganese oxide and 1.08 to 2.43 weight percent of lanthanum oxide having an electromechanical coupling factor $k_{33}$ of 42 to 50%, a mechanical quality factor of about 1000, a dielectric constant of about 200 and Vicker's hardness of 500. The novel ceramic is suitable for making a high frequency ceramic filter of wide pass band and low transmission loss.

This invention relates to piezoelectric ceramic composition which is suitable for making ceramic filters for high frequency operation, and more particularly to a piezoelectric ceramic composition consisting essentially of lead titanate incorporated with a combined addition of manganese oxide and lanthanum oxide.

Ferroelectric ceramics such as barium titanate and lead titanate-lead zirconate ceramics polarized under a D.C. field have been used as piezoelectric transducers. It is difficult, however, to use these ceramics for higher frequencies than 10 mHz., because the dielectric constants of these ceramics are of the order of 1000 and the electrical impedance of transducers becomes too low at high frequencies.

Lead titanate ceramics have a dielectric constant of about 200. Therefore, a transducer comprising lead titanate ceramics has high potential for use in high frequency transducers, but lead titanate ceramics usually have a small electromechanical coupling factor of 30% or less and a low mechanical quality factor of 300 or less.

The piezoelectric ceramic transducer, especially the ceramic filter requires a large electromechanical coupling factor as well as a high mechanical quality factor. The large electromechanical coupling factor is necessary for a wider pass band of filter, because the band width is proportional approximately to the square of the coupling factor. A high mechanical quality factor is required in order to reduce the transmission loss which appears when electrical signals are transmitted through the ceramic filter.

The copending U.S. patent application Ser. No. 860,312 has disclosed that lead titanate ceramics containing a small amount of manganese oxide have dielectric constants of about 160 and mechanical quality factor above 100, and are suitable as high frequency filter materials. These materials, however, have an electromechanical coupling factor $k_{33}$ of 40% at most, and Vicker's hardness of 630. This hardness is too high for the mechanical machining. It is desirable to improve electromechanical coupling factor and mechanical hardness of these materials.

An object of this invention is to provide piezoelectric ceramics which have high electromechanical coupling factor together with low dielectric constant and high mechanical quality factor.

Other object is to provide piezoelectric ceramics with hardness suitable for carrying out mechanical machining.

Figure 1:
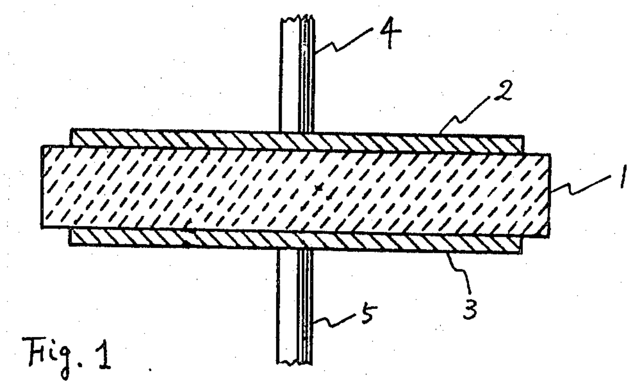
Figure 2:
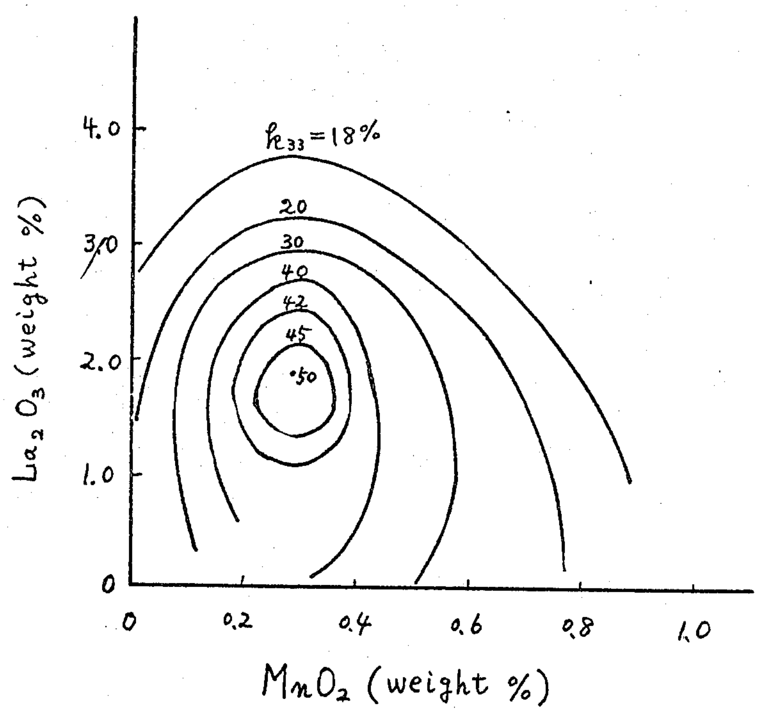

These and other objects of this invention will be apparent upon consideration of following detailed description taken together with the accompanying drawings; wherein FIG. 1 is a cross-sectional view of a ceramic filter, and FIG. 2 sets forth contour-lines of electromechanical coupling factor $k_{33}$ for various compositions.

Before proceeding with a detailed description of the novel piezoelectric ceramic compositions, an exemplary construction of a ceramic filter comprising piezoelectric ceramic materials according to the present invention will be explained with reference to FIG. 1, wherein reference character 1 designates a disc shaped body of ceramic material. The body 1 has a pair of electrodes 2 and 3 applied to the two opposite surfaces thereof. Conducting leads 4 and 5 are attached to electrodes 2 and 3, respectively. The body 1 is polarized electrostatically through the leads 4 and 5 in order to give piezoelectricity.

The present inventors have discovered that the body 1 consisting of essentially of lead titanate and a combined additive of 0.22 to 0.36 weight percent of manganese oxide and 1.08 to 2.43 weight percent of lanthanum oxide has a large electromechanical coupling factor $k_{33}$ of 42 to 50% and a Vicker's hardness of 500 together with a dielectric constant of about 200 and mechanical quality factor of about 1000. Thus, the piezoelectric ceramic composition according to the invention is suitable for making a ceramic filter which can operate at high frequency with wide pass band and low transmission loss. The ceramics having a low hardness are easily formed into ceramic filters by machining.

The starting materials are chemically pure lead oxide, titanium oxide, manganese oxide and lanthanum oxide. Any other forms, such as carbonates and hydroxides, which may be converted into the desired oxides can be used as starting materials. The ceramic body according to the invention can be fabricated in a per se well known ceramic technique. Mixtures in a given composition are, for example, mixed well with water in a ball mill, dried under infrared radiation, pressed loosely into a pellet and calcined at 700 to 900° C. for 2 hours. The calcined pellet is then ground thoroughly and pressed at about 1000 kilograms per square centimeter into the form of disc in accordance with the prior ceramic technique. These discs are heated at 1200 to 1300° C. for 1 hour in air, and furnace cooled. The sintered body is electroded as shown in FIG. 1, and polarized under a D.C. field of 30 to 60 kv./cm. at 150 to 250° C. The piezoelectric properties of the polarized ceramics are measured by per se well known methods. The effects of combined addition of manganese oxide and lanthanum oxide are shown in the table. For comparison, lead titanate ceramics having a single addition of manganese oxide or lanthanum oxide are also prepared in a manner similar to that for above combined addition. The effects of single addition also are shown in table.

The electromechanical coupling factor $k_{33}$ has been measured on ceramics polarized under a D.C. field of 55 kv./cm. at 200° C.

Lead titanate ceramics containing only lanthanum oxide (samples 1 to 3) have a low electromechanical coupling factor $k_{33}$ of 20% or less, as shown in the table. Some lead titanate ceramics containing only manganese oxide have a large electromechanical coupling factor. Sample 4 containing 0.29 weight percent of manganese oxide has a coupling factor $k_{33}$ of 40%.

It has been discovered according to the present invention that a combined addition of 0.22 to 0.36 weight percent of manganese oxide and 1.08 to 2.43 weight percent of lanthanum oxide leads to further enhancement of the coupling factor $k_{33}$ of lead titanate ceramics. Samples 7 to 28 in table contain a combined additive of manganese oxide and lanthanum oxide. FIG. 2 shows the contour lines of coupling factor $k_{33}$ drawn in the composition diagram of additives with reference to table. FIG. 2 shows clearly that a combined addition of 0.22 to 0.36 weight percent of manganese oxide and 1.08 to 2.43 weight percent of lanthanum oxide provides a peak of coupling factor $k_{33}$.

As shown in table, electromechanical coupling factors $k_{33}$ of samples 10, 12 to 17 and 22 exceed 40%, especially that of sample 15 reaches to 50%. The increase of coupling factor $k_{33}$ from 40% to 50% means an increase of 56% in pass band of ceramic filter; even an increase of $k_{33}$ from 40% to 42% brings an increase of 10% in pass band. This fact is important for construction of ceramic filter with wide pass band. Samples 10, 12 to 17 and 22 all contain a combined additive consisting of 0.22 to 0.36 weight percent of manganese oxide and 1.08 to 2.43 weight percent of lanthanum oxide; these ceramics have a dielectric constant of about 200 and a mechanical quality factor of about 1000, and retain their characteristics as ceramic material for high frequency operation.

Sample 4 which contains only $MnO_2$ has coupling factor of 40% but also has high Vicker's hardness of 630. On the other hand, samples 10, 12 to 17 and 22 according to the present invention have Vicker's hardness of 500, and therefore have advantage in ease of mechanical machining to produce a ceramic filter.

Oxides of other rare earth elements, for example, cerium oxide and gadolinium oxide may replace lanthanum oxide to give similar effects.

As mentioned above, piezoelectric ceramics according to the present invention have a large electromechanical coupling factor $k_{33}$, large mechanical quality factor, small dielectric constant and small Vicker's hardness, and it will be readily understood that the piezoelectric ceramic compositions according to the invention are quite suitable for construction of high frequency, wide pass band and low transmission loss ceramic filter.

TABLE

| Sample number | Additive to lead titanate (weight percent) | | Electromechanical coupling factor $k_{33}$ (percent) | Vicker's hardness |
|---|---|---|---|---|
| | $MnO_2$ | $La_2O_3$ | | |
| 1 | 0.0 | 0.54 | 18 | |
| 2 | 0.0 | 1.34 | 20 | |
| 3 | 0.0 | 2.68 | 18 | |
| 4 | 0.29 | 0.0 | 40 | 630 |
| 5 | 0.51 | 0.0 | 30 | |
| 6 | 0.73 | 0.0 | 22 | |
| 7 | 0.14 | 1.62 | 40 | |
| 8 | 0.14 | 2.69 | 30 | |
| 9 | 0.14 | 3.77 | 16 | |
| 10 | 0.22 | 1.62 | 45 | 500 |
| 11 | 0.29 | 0.54 | | Fragile |
| 12 | 0.29 | 1.08 | 42 | 500 |
| 13 | 0.29 | 1.35 | 45 | 500 |
| 14 | 0.29 | 1.62 | 48 | 500 |
| 15 | 0.29 | 1.89 | 50 | 500 |
| 16 | 0.29 | 2.16 | 45 | 500 |
| 17 | 0.29 | 2.43 | 42 | 500 |
| 18 | 0.29 | 2.70 | 40 | |
| 19 | 0.29 | 2.97 | 30 | |
| 20 | 0.29 | 3.24 | 20 | |
| 21 | 0.29 | 3.78 | 18 | |
| 22 | 0.36 | 1.63 | 45 | 500 |
| 23 | 0.43 | 1.09 | 40 | |
| 24 | 0.43 | 2.17 | 35 | |
| 25 | 0.43 | 3.25 | 18 | |
| 26 | 0.58 | 1.09 | 30 | |
| 27 | 0.73 | 1.09 | 20 | |
| 28 | 0.88 | 1.09 | 18 | |

The embodiments of the invention in which exclusive property or privilege is claimed are defined as follows:

1. A piezoelectric ceramic composition consisting essentially of lead titanate and combined additive of 0.22 to 0.36 weight percent of $MnO_2$ and 1.08 to 2.43 weight percent of $La_2O_3$.

References Cited

UNITED STATES PATENTS 3,526,597 9/1970 Ikegami et al. ........ 252—62.9

OTHER REFERENCES

Matsuo et al., "Journal of The American Ceramic Society," vol. 48, pp. 111–112 (1965).

Tomashpol'skii et al., "Fiz. Tverd. Tela," 7(9), pp. 2763–7 (1965).

JAMES E. POER, Primary Examiner

J. COOPER, Assistant Examiner

U.S. Cl. X.R.

106—39 R